INVENTOR.
Walter H. West

May 25, 1971 W. H. WEST 3,579,733
APPARATUS FOR VARIABLE PARISON FORMING
Filed Feb. 5, 1969 4 Sheets-Sheet 2

INVENTOR.
Walter H. West
BY
ATTORNEY

May 25, 1971 W. H. WEST 3,579,733
APPARATUS FOR VARIABLE PARISON FORMING
Filed Feb. 5, 1969 4 Sheets-Sheet 3

INVENTOR.
Walter H. West
BY
ATTORNEY

United States Patent Office 3,579,733
Patented May 25, 1971

3,579,733
APPARATUS FOR VARIABLE PARISON FORMING
Walter H. West, Bay City, Mich., assignor to The Dow Chemical Company, Midland, Mich.
Division of application Ser. No. 615,032, Feb. 9, 1967, which is a continuation of application Ser. No. 288,863, June 17, 1963. This application Feb. 5, 1969, Ser. No. 813,358
Int. Cl. B29d 23/04
U.S. Cl. 18—14
2 Claims

ABSTRACT OF THE DISCLOSURE

This invention relates to apparatus for controlling the diameter and thickness of an extruded plastic melt. More particularly, this invention relates to the control of parison diameter by rotation of one extruding die member in relation to another.

---

This is a division of application Ser. No. 615,032, filed Feb. 9, 1967, which in turn is a continuation of application Ser. No. 288,863, filed June 17, 1963, both now abandoned.

The known art of changing the shape of an extruded tube or parison is by lowering or lifting a tapered mandrel within a tapered bore of a die and thus increasing or decreasing the flow of polymer by enlarging or reducing the size of the channel through which it passes. This is generally programmed and is somewhat difficult to control because of adjustment precision and alignment problems. For example, a mandrel with little tapering can be moved with precision but misaligns itself in a relatively short period, while a mandrel with a higher degree of taper does not misalign a great deal, but does require a precision moving device. Thus, prior art devices have proven particularly inefficient and have been able to produce only straight line parisons permitting variations only in parison wall thickness. However, when it is desired to form odd shaped containers, to eliminate or to reduce the width of a bottom pinch-off, such straight line parison extrusion techniques have proven substantially ineffectual.

Accordingly, it is an object of the present invention to provide apparatus whereby a uniform change in a tubular or parison shape can be readily and efficiently accomplished.

It is another object of the present invention to provide an apparatus whereby parison diameters can be readily controlled by variable rotation of die members.

A still further object of the present invention is to provide apparatus whereby a variable diameter parison can be obtained with the variations being locatable at any point therein, such permitting decorative blown articles and blown articles having reduced pinch widths even though the body of the parison be enlarged for handle formation.

In accord with the last mentioned object, more specifically it is an object of the present invention to provide apparatus for forming certain shaped bottles which eliminates or reduces the bottom pinch width so that stress cracking at corners is substantially eliminated.

Yet another object of the present invention is to provide apparatus whereby material distribution in a finished product is satisfactorily accomplished by placing polymer in proper locations in a parison in order to compensate for draw down and blowing.

A still further object of the present invention is to provide apparatus whereby polymer swell can be compensated for and increased physical properties can be given to finished containers by an orientation effect and by randomizing of die weld lines through rotational effects of members at a die orifice.

Briefly then, the present invention comprises the use of a molding die wherein either the extruding extremity of the die member or of the die mandrel, or both, are made movable with respect to one another, in a rotational manner, whereby variations in the speed of the rotating member or members results in an extruded tube or parison having an increased or decreased diameter where such is desirable for purposes of forming irregular shaped objects or for reducing or eliminating the bottom pinch width of a container about to be formed. Thickness control of the parison wall can also be obtained by combining the apparatus of the present invention with tapering die portions which can be relatively raised and lowered in a conventional manner.

Yet additional objects and advantages of the present invention, and its numerous cognate benefits and features are even more apparent and manifest in and by the ensuing description and specification taken in conjunction with the accompanying drawing in which, wheresoever possible, like characters of reference designate corresponding material and parts throughout the several views thereof, in which.

Figure 1:
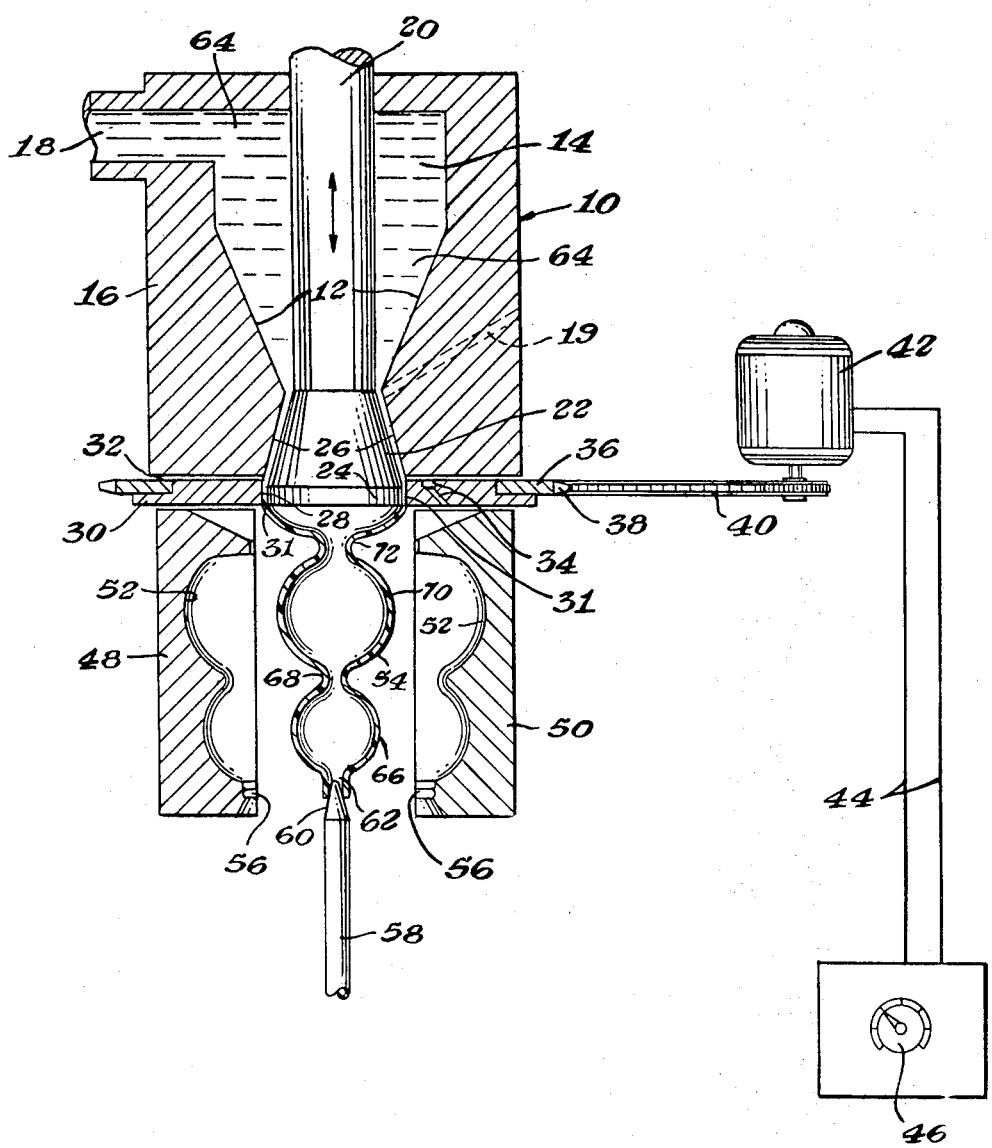
FIG. 1 is a fragmentary sectional view of apparatus formed according to the principles of the present invention and illustrating a parison formed with a variable diameter.

The present invention is concerned primarily with the extrusion head of plastic forming apparatus and with the construction and operation of the extruding members at the orifice thereof. Accordingly, only so much of the surrounding apparatus is illustrated as is necessary for a full understanding of the present invention. Thus, referring more particularly to FIG. 1, reference numeral 10 generally designates the extrusion head which is vertically bored as at 12 to form the confines of an annular extrusion chamber 14, the bore being located in body member 16. A lateral passage 18 in body member 16 leads to the upper end of chamber 12, which passageway receives moldable plastic material 64, such as polyethylene or polystyrene or other thermoplastic polymers or copolymers, from conventional plasticizing apparatus, under pressure, as familiar to those skilled in the art. Optionally included can be a port 19 leading into bore 12 for the addition of coloring pigment or other additives, as the occasion demands.

Extending axially through the center of chamber 12 is a mandrel 20 of circular cross section which, in this particular embodiment, is fixed in position with respect to rotational movement about its vertical axis, but which can also be vertically movable if desired. It is noted that mandrel 20 carries a base 22 which is tapered outwardly along its side toward its major diameter as defined by end portion 24, the latter having a vertically disposed side wall. In conformity therewith the bore 12 of chamber 14 includes wall section 26 which is substantially parallel to the tapered side of the base 22 of the mandrel.

Located directly below body member 16 is a rotational ring-shaped die member 30 which includes an internal wall 28 which is parallel and thus vertically disposed with the side of end portion 24 of mandrel 20. The orifice 31 at the end of extruder head 10 is thus defined by mandrel 20 about its inner circumference and by die member 30 about its outer circumference. A gap 32 between body member 16 and die member 30 is only wide enough to permit free rotation of the die member with respect to the body member and is not so wide as to cause excessive run off of polymer therethrough when the extrusion head 10 is in an operating condition. An escape passage 34 can be provided for an excess polymer run off, if so desired. Due to the low pressure encountered at this particular portion of the extruding head, as a result of pressure drop, no problem of any consequence will be encountered in polymer loss through the gap 32 if it is of a proper size.

Die member 30 is provided with a projecting sprocket ring 36 containing teeth 38 which fit within the sprockets of chain 40, the latter in turn being driven by a variable speed motor 42. The variable speed motor is controlled through electric leads 44 by a control box 46 in the conventional manner.

Located closely beneath die member 30 are split mold halves 48 and 50 which are adapted to move in opposed lateral directions so as to open and closs in a conventional manner, such as taught in U.S. Pat. 3,052,916. It is noted, however, that the internal cavity 52 of the molds 48 and 50 is of a generally inverted figure-eight configuration and that an extruded tube or parison 54 is of a similar but smaller configuration. In this particular embodiment the neck portion 56 of the mold halves 48 and 50 is located at the lower end of the mold formed by halves 48 and 50. A tube 58, adapted for entry by a tapered head 60 into neck 62 of parison 54, is employed for injecting air for blowing the parison 54 as described below.

It is apparent from the above described apparatus that the die member 30 is permitted to rotate at varying speeds with respect to the non-rotating mandrel 20 so that the inner wall 28 and the outer surface of the end portion 24 will spin or cycloidally revolve the extruded plastic material 64 at the die exit in forming parison 54. This rotation at the die exit forming the orifice 31 produces a reduction in diameter with a result that the parison can achieve a configuration smaller than that which is produced by normal straight stationary dies. Thus, the resulting parison can have a diameter less than that formed (including diameter swell) by stationary dies wherever a reduction in diameter is found to be desirable.

Variations in the speed of the rotating die member 30 can thus achieve a material distribution in a finished container by making areas having different diameters to compensate for draw down and blowing by placing polymer at optimum locations. It can also compensate for polymer swell and can provide an orienting effect and for randomizing of weld lines such as described in more detail, for example, in U.S. Pat. 2,937,402.

Figure 8:
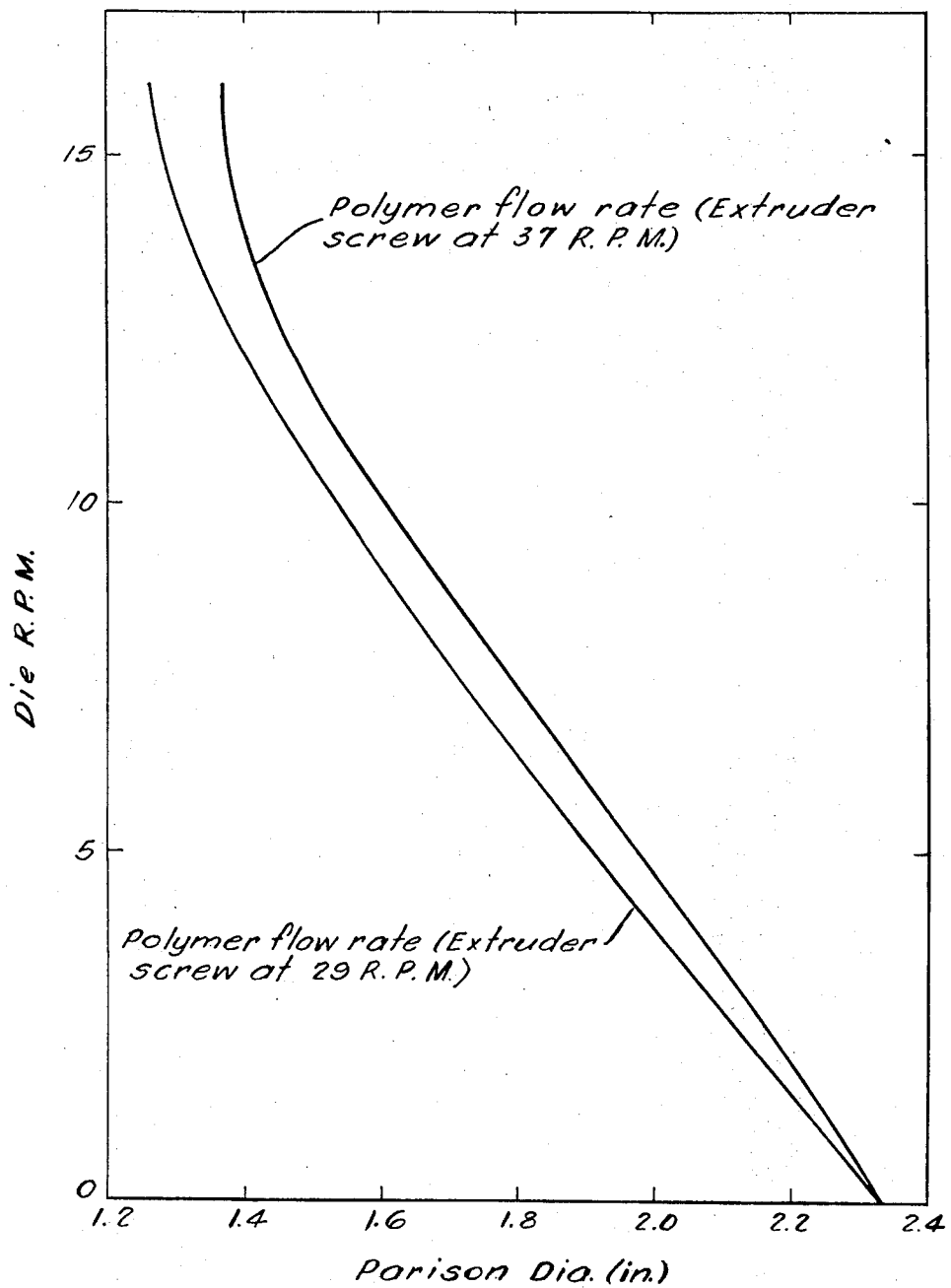
FIG. 8 is a graphical illustration of the relationship between parison diameter and the speed of rotation of a die member at certain polymer flow rates.

For example, as shown in the graph of FIG. 8, the die revolutions per minute (rotational speed of die member 30) is plotted against the parison diameter, in inches, at two different extruder speeds for a given material, in this instance a polyethylene material having a density of approximately 0.96, thus illustrating that with a given flow rate of polymer the parison diameter can be decreased to the degree desired (full closure being omitted from graph), the rate of diameter decrease apparently being less as the flow rate of polymer increases.

Thus, in forming parison 54, die member 30 is rotated at a given speed, as the plastic material 64 is being extruded, to provide a relatively narrow neck 62. The speed is then reduced to form the bulbular portion 66 of the parison. Then the speed is increased to form a reduced diameter section 68 and then is entirely stopped to form the bulbular portion 70. It is then again increased to form the relatively closed spaced walls of the parison bottom 72. By using a timed speed control device 47, which can be programmed for production operations, the reduced diameter sections can be achieved as desired, with bottom 72 being pinch welded at the right point by mold halves 48 and 50, this operation to be described in more detail hereinafter. Thus, in forming parison 54 the rotational speed of die member 30 is programmed between zero and some upper limit so that a blow shape of many different diameters can be had with uniform wall thickness to reduce bottle weight and material costs.

If it is desired for some reason to also vary the thickness of the parison wall as it is being extruded, mandrel 20 can be moved upwardly and downwardly with respect to body member 16 so that the parallel wall section 26 and the side of base 22 can be employed to provide a narrower or a wider channel for plastic material flow, as needed.

One of the outstanding advantages of the above described procedure is that it is adapted to using any plastic material while, quite to the contrary, each molding die in the prior art has to be set up for using one particular molding material, the characteristics of different materials providing different degrees of diameter swell. However, by using the apparatus of the present invention, the rotation of the die member can be programmed for any viscosity or other characteristic of a particular material so that if the die exit opening is wide enough initially, the resulting parison can be reduced to any size to compensate for these material characteristics. Additionally, effective control of the draw can be had by regulating the speed at which the parison is extruded as well as by regulating the speed of the die member rotation.

Figure 2:
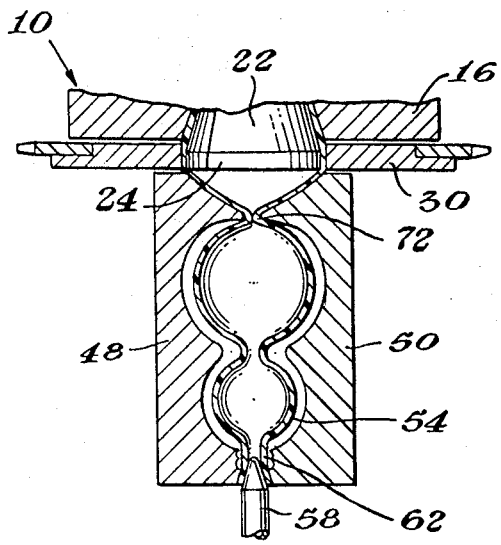
FIG. 2 is a portion of the apparatus illustrated in FIG. 1 only showing the mold halves in a closed position.
Figure 3:
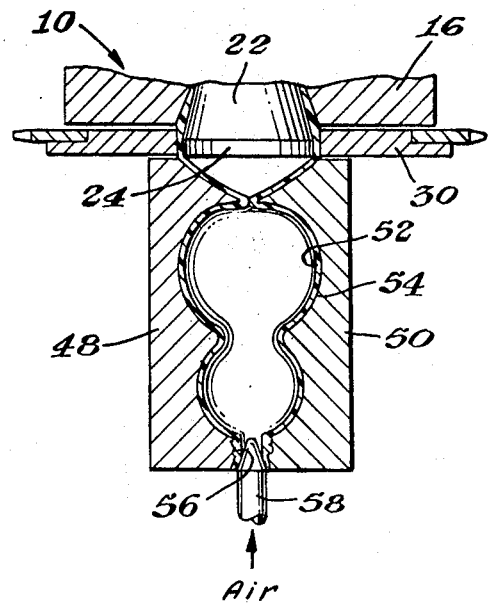
FIG. 3 is a view similar to FIG. 2 only showing the parison being blown against the walls of the mold.
Figure 4:
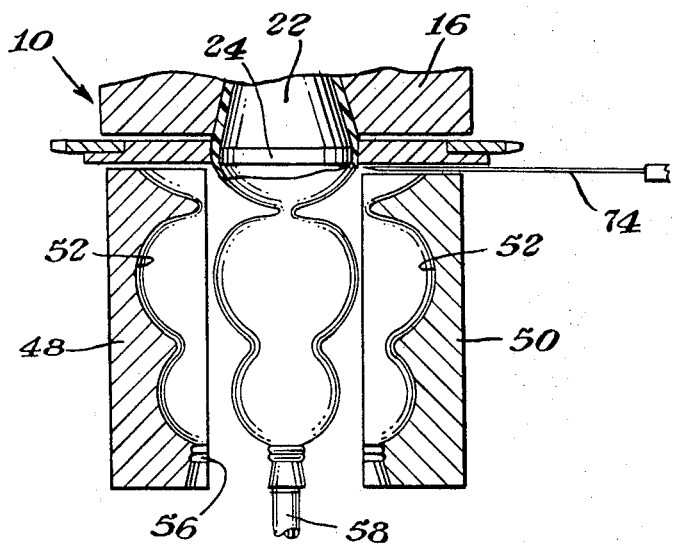
FIG. 4 is a view similar to FIG. 3 only showing the mold halves open thus exposing the resulting blown container.

Thus, referring now more particularly to FIGS. 2, 3 and 4, it can be seen that in FIG. 2 the mold halves 48 and 50 are closed so as to pinch together the reduced diameter bottom 72 of the parison 54 as well as partially form the neck 62. In FIG. 3 air is shown as being injected through tube 58 so as to blow the parison 54 against the cavity 52 and neck portion 56 of the mold halves 48 and 50. The mold halves 48 and 50 are shown opened in FIG. 4 and the knife blade 74 is ready to be inserted across the top thereof to sever the formed parison from the die member 30 so that it can be ejected for further trim operation.

Figure 5:
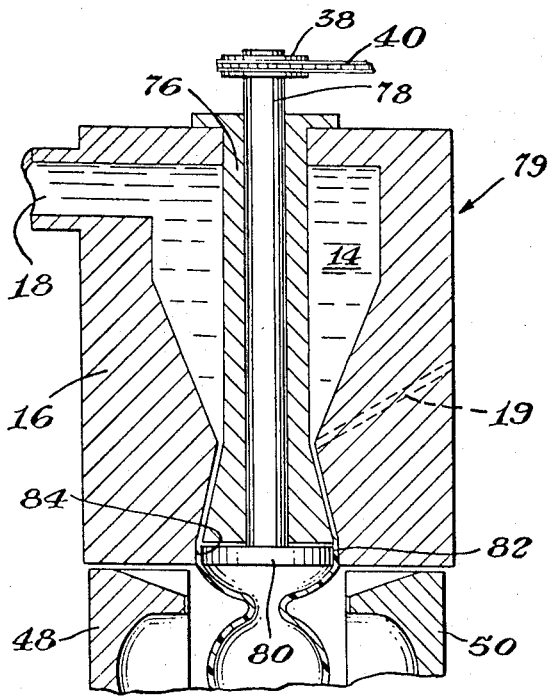
FIG. 5 is a view similar to FIG. 1 only showing a modified form of apparatus whereby the mandrel includes a rotatable die member.

FIG. 5 is an illustration of an alternate extruder head 79 for achieving results that are similar to those achieved with the apparatus 10 shown in FIG. 1. Here the die member 30 has been eliminated and instead body member 16 has been extended to the exit end of extruder head 79. A hollow mandrel 76 has been located within body member 16 and carries a rotatable shaft 78 which includes a die base 80 at the exit end of the extruder head. Die base 80 includes vertical surface 82 parallel with an inner surface 84 of die member 16. Shaft 78 is driven by a variable speed motor (not shown) and chain 40 connected with a sprocket system 38 integral with shaft 78. Thus again, relative rotation between the portions of the extruding head at the exit end of the die is obtained so that rotation of the die base 80 will result in a decrease in the diameter of the resulting parison, as desired.

Also included within the concept of the present invention, but not shown specifically herein since it is felt to be an obvious extension of the different modifications of FIGS. 1 and 5, can be the provision of a rotating die head portion, such as die member 30, in combination with a rotating die mandrel, such as base 80, so that relative rotation of the two can achieve substantially similar or improved results by operating at different rates and/or in opposite directions, to accentuate the advantages heretofore mentioned with respect to extruding apparatus including just one rotating member at the die exit.

Figure 6:
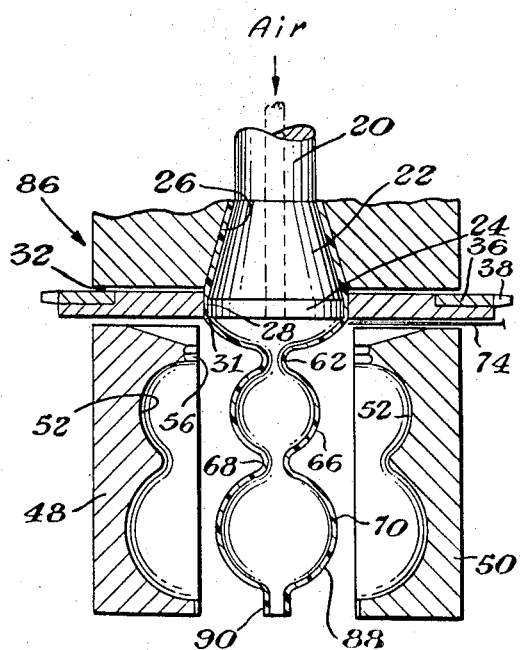
FIG. 6 is a view similar to FIG. 1 showing still another modified form of apparatus whereby the bottom is formed with a reduced pinch width.

In yet another embodiment, FIG. 6 is an illustration of an extruder head and mold apparatus 86 wherein the principle of the present invention is adapted to the forming of a variable diameter parison wherein the bottom of the resulting container is to be formed at the lower end of the mold halves 48 and 50 and the neck portion 62 is to be formed at the upper end. It can thus be seen that the parison 88 resulting from this configuration can include the obvious advantage of having the parison diameter reduced at the base 90 of the container so that the bottom pinch width is substantially reduced with the result that the base of the resulting container will have a shorter pinch weld to reduce the problem of stress cracking, particularly at the corners or edges of relatively large containers.

Figure 7:
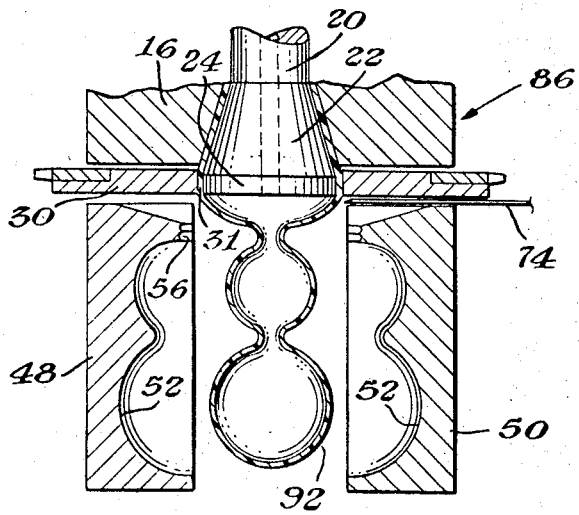
FIG. 7 is a view similar to FIG. 1 only showing yet another modified form of apparatus whereby the bottom of a container is fully formed by a spinning rotatable die member.

FIG. 7 is an illustration of another modification which is substantially similar to FIG. 6 only illustrating a container wherein the degree of parison diameter reduction initially, by rotating die member 30, is so great that the parison is formed closed at its base so as to present a container having a bottom without a pinch-off, and one which requires no subsequent bottom trimming step, where this may be desirable. Thus, the parison 92 need be trimmed only at its neck portion once separated from the apparatus there shown.

In the modifications illustrated in FIGS. 5, 6 and 7 it is to be understood that subsequent steps of closing the mold halves, blowing, opening the mold halves and separating the blown article are similar to those illustrated in FIGS. 2, 3 and 4 and thus were not herein specifically shown. To illustrate the possibilities of the present invention, a container having the configuration of a figure-eight has been chosen throughout the views. However, it is to be understood that the parison control need not be limited to any such configuration and may be employed, for example, only at the base on the container to reduce or eliminate pinch-off, it may be used to form conically shaped containers, or can be employed to form any one of a number of other desired parison or other tubular configurations. Thus, while certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. In apparatus for forming hollow articles from plastic material, said apparatus including extrusion means for extruding a tube of plastic material through an annular orifice at the exit end of an extruder head, said orifice being defined by a mandrel about its inner circumference and a die member about its outer circumference, means for rotating at least one of said mandrel and said die member at variable speeds with respect to the other of said mandrel and said die member substantially greater than one-quarter revolution per minute as said material is being extruded such that varying diameters in said tube can be provided, adjacent surfaces of said mandrel and said die member being tapered but parallel to one another, and means for moving said mandrel simultaneously with said first mentioned means and transversely of a plane formed by the end of said extruder head about said orifice whereby the thickness of the tubes walls can be varied simultaneously with the varying of the parison diameter.

2. The apparatus of claim 1 wherein said first mentioned means is capable of rotating said mandrel or die member more than one turn.

References Cited

UNITED STATES PATENTS 3,070,840   1/1963   Mercer _____ 18—14X
3,218,672   11/1965  Langecker _____ 18—14

H. A. KILBY, JR., Primary Examiner

U.S. Cl. X.R.

18—14